United States Patent [19]
Baudhuin

[11] Patent Number: 6,029,588
[45] Date of Patent: Feb. 29, 2000

[54] CLOSED CYCLE WASTE COMBUSTION

[75] Inventor: Thomas J. Baudhuin, Oshkosh, Wis.

[73] Assignee: Minergy Corp., Milwaukee, Wis.

[21] Appl. No.: 09/055,502

[22] Filed: Apr. 6, 1998

[51] Int. Cl.[7] .................................................. F23B 7/00
[52] U.S. Cl. ........................ 110/344; 110/342; 110/345; 110/346; 110/233
[58] Field of Search .................................. 110/342, 344, 110/345, 346, 348, 233, 204, 205; 266/156

[56] References Cited

U.S. PATENT DOCUMENTS

| | | | |
|---|---|---|---|
| 402,787 | 5/1889 | McIntosh Valon . | |
| 1,598,985 | 9/1926 | Petit . | |
| 1,817,908 | 8/1931 | Belt . | |
| 1,937,832 | 12/1933 | McKee | 23/150 |
| 2,594,269 | 4/1952 | Geisel | 23/150 |
| 2,690,425 | 9/1954 | Moses et al. | 210/2 |
| 2,726,932 | 12/1955 | Shire | 23/153 |
| 2,756,121 | 7/1956 | Grimes | 23/1 |
| 3,293,113 | 12/1966 | Venemark | 162/30 |
| 3,471,275 | 10/1969 | Borggreen | 48/209 |
| 3,511,595 | 5/1970 | Fuchs | 23/4 |
| 3,890,432 | 6/1975 | White | 423/655 |
| 3,949,056 | 4/1976 | Nakshbendi | 423/210 |
| 4,232,614 | 11/1980 | Fitch et al. | 110/346 X |
| 4,255,114 | 3/1981 | Aerne | 431/2 |
| 4,406,867 | 9/1983 | Marcinkowsky et al. | 423/226 |
| 4,460,395 | 7/1984 | Nobles et al. | 62/18 |
| 4,542,114 | 9/1985 | Hegarty | 402/39 |
| 5,134,944 | 8/1992 | Keller et al. | 110/346 X |
| 5,135,723 | 8/1992 | Fuller | 422/184 |
| 5,170,725 | 12/1992 | Sass et al. | 110/346 X |
| 5,179,903 | 1/1993 | Abboud et al. | 110/345 |
| 5,230,211 | 7/1993 | McMahon et al. | 110/346 X |
| 5,255,616 | 10/1993 | Wintrich et al. | 110/345 X |
| 5,309,850 | 5/1994 | Downs et al. | 110/235 |
| 5,445,088 | 8/1995 | Daugherty et al. | 110/346 |
| 5,550,312 | 8/1996 | Schingnitz et al. | 588/205 |
| 5,565,089 | 10/1996 | Ramachandran et al. | 208/113 |
| 5,584,255 | 12/1996 | Bishop et al. | 110/346 X |
| 5,678,498 | 10/1997 | Whaley | 110/345 |
| 5,826,521 | 10/1998 | Schumann et al. | 110/346 X |
| 5,922,090 | 7/1999 | Fujimura et al. | 110/345 X |

FOREIGN PATENT DOCUMENTS

| | | |
|---|---|---|
| 30 12 167 A1 | 10/1980 | Germany . |
| 2113815 | 8/1983 | United Kingdom . |

*Primary Examiner*—Ira S. Lazarus
*Assistant Examiner*—Ljiljana V. Ciric
*Attorney, Agent, or Firm*—Quarles & Brady LLP

[57] ABSTRACT

Non-hazardous organic waste material is introduced into a slagging combustor where it is burned. The burning produces exhaust gases and a slag of molten, inorganic ash which is removed from the combustor. The exhaust gases are treated to cool and dry the gases and to remove a major portion of particulate matter contained therein. A portion of the treated exhaust gases is mixed with a source of concentrated oxygen in a proportion that results in mixed gases having an oxygen concentration of at least 30% by volume. The mixed gases are introduced into the combustor to support the burning of the waste material. Another portion of the treated exhaust gases is further treated to recover the carbon dioxide therefrom.

24 Claims, 1 Drawing Sheet

CLOSED CYCLE WASTE COMBUSTION

BACKGROUND OF THE INVENTION

This invention relates to the combustion of organic waste material, and particularly to a closed cycle combustion of waste material using concentrated oxygen.

Waste materials such as municipal solid waste, waste water treatment sludge, and paper mill sludge, are often treated by incineration. Such waste material contains organic combustible matter and inorganic metal oxides. The organic combustible matter typically provides sufficient thermal energy during combustion to maintain high combustion chamber temperatures without the need for supplemental fuel. The inorganic portion of the waste material is characterized by the presence of some silica ($SiO_2$) and other glass forming metal oxides. If a slagging combustor such as a rotary kiln or cyclone furnace is used for combustion, the inorganic portion of the waste material can reach a temperature high enough to melt. The resulting molten material is drained from the combustion chamber as slag.

Conventional incinerators designed to combust organic waste material use air as the oxidizer source. Since almost four-fifths of air is inert gases (primarily nitrogen), a major portion of the air provides no benefits to the combustion process. In fact, the inert gas causes several distinct disadvantages. A first disadvantage is that the combustion flame temperature is lowered, thereby making it difficult to maintain the necessary temperatures to melt the inorganic metal oxides in the waste material. Secondly, the waste gases from the incineration will be contaminated with substantial amounts of nitrogen that results in a large volume of exhaust gases which require further treatment before release into the atmosphere.

It has been proposed to reduce the undesirable effects of nitrogen in the incineration of hazardous waste by introducing concentrated oxygen into the combustion chamber along with recycled exhaust gases. See U.S. Pat. No. 5,309,850 issued May 10, 1994, to Downs, et al.

The present invention also uses concentrated oxygen in a closed cycle to treat non-hazardous waste and to convert the waste material into useful end products.

SUMMARY OF THE INVENTION

In accordance with the invention, the non-hazardous organic waste material is introduced into a slagging combustor where it is burned. The burning produces exhaust gases and a slag of molten, inorganic ash which is removed from the combustor. The exhaust gases are treated to remove a major portion of particulate matter contained therein. A portion of the treated exhaust gases is mixed with a source of concentrated oxygen in a proportion that results in mixed gases having an oxygen concentration of at least 30% by volume. The mixed gases are introduced into the combustor to support the burning of the waste material.

Preferably, the proportion of oxygen in the mixed gases is from about 40% to 50% by volume. The exhaust gases may be cooled and dried before mixing with the concentrated oxygen.

Further in accordance with the invention, a second portion of the treated exhaust gases may be treated to remove the carbon dioxide therefrom. The removed carbon dioxide is preferably converted into a liquid form.

Also in accordance with one embodiment of the invention, a portion of the heat from the exhaust gases is transferred to the mixed gases before the mixed gases are introduced into the combustor.

The invention further comprises apparatus for carrying out the method.

The resulting products of the process of the invention are useful. The liquefied carbon dioxide can be marketed and utilized as a product. The carbon dioxide thus produced would displace carbon dioxide that is currently produced using natural gas or other natural resources thereby conserving on natural resources. The inorganic products in the waste material are vitrified into a highly inert granular material which may be used as a construction material. Conventional waste material incinerators generally produce ash that must be land filled. With the exception of a small amount of non-condensible gas at the exit of the carbon dioxide recovery system, there are no emissions into the air and the environmental impacts are insignificant as compared to conventional incineration processes which have significant emissions.

The foregoing and other objects and advantages of the invention will appear in the detailed description which follows. In the description, reference is made to the accompanying drawing which illustrates a preferred embodiment of the invention.

DETAILED DESCRIPTION OF THE PREFERRED EMBODIMENT

Figure 1:
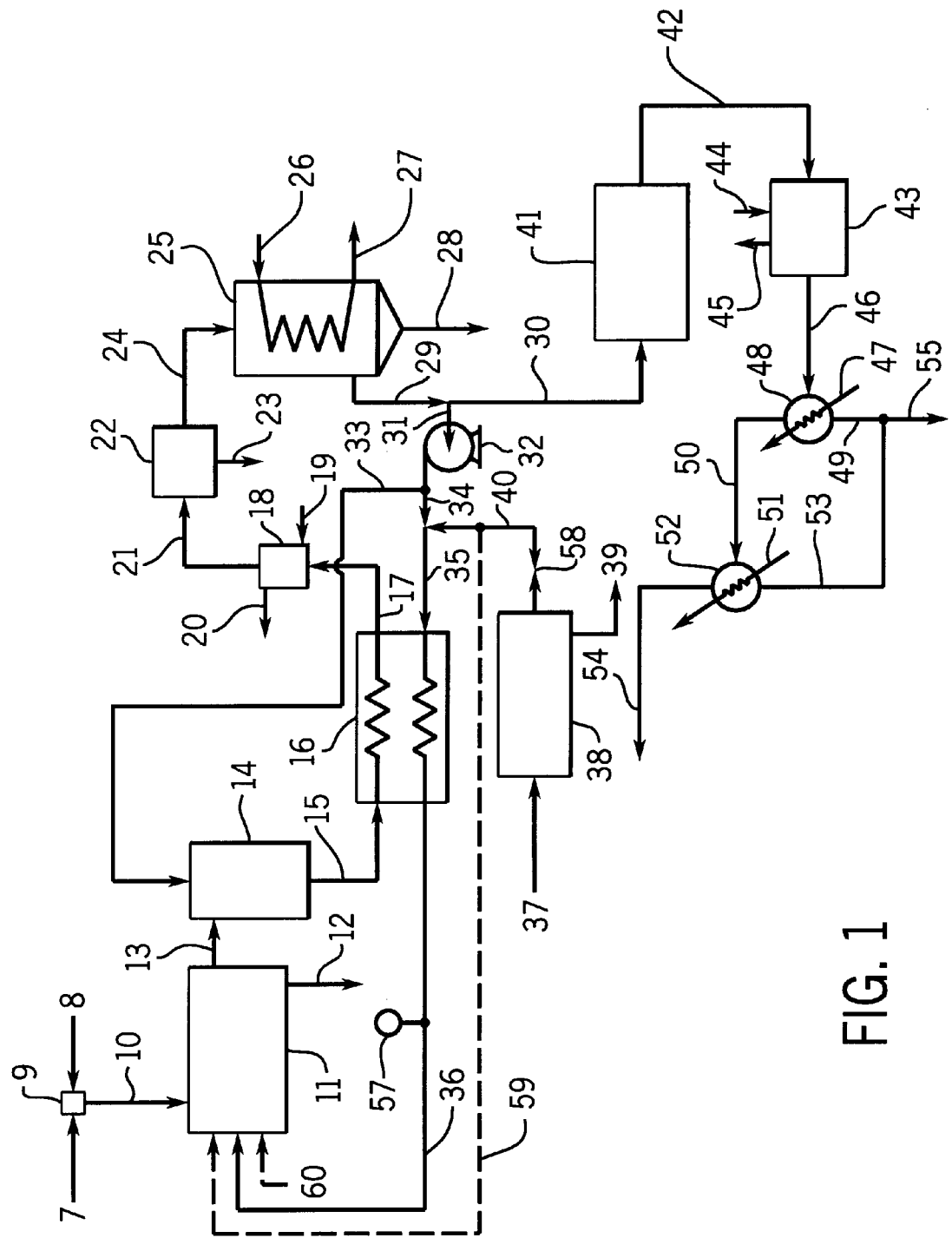
FIG. 1 is a schematic diagram of the apparatus for carrying out the invention.

Referring to FIG. 1, dry waste material (with moisture content low enough to support good combustion) is introduced through line 7 into mixer 9. With some waste materials, it may be necessary to add either fluxing agents, glass forming materials (such as $SiO_2$), or both to optimize melting point and to assure good quality of glass slag produced. The fluxing agent and/or glass forming material are introduced in line 8 in the mixer 9. The mixed material is introduced through line 10 into combustion chamber 11.

The waste material may consist of paper mill sludge, municipal waste water treatment sludge, municipal solid waste, or like materials. The waste material is characterized by a heating value lower than conventional fuels and by an ash content that is higher than conventional solid fuels such as coal. The heating value will typically range, but is not limited to, values of 500 Btu/lb to 9,000 Btu/lb. Ash content will typically range from 5% to 65%. Combustion chamber 10 is a refractory lined chamber. The combustion chamber is designed to promote good contact of the waste material and the gas source. The combustion chamber may be a water cooled combustion chamber, a cyclone furnace, or a rotary kiln. The average operating temperature of the combustion chamber will normally range from 2,500° F. and 3,500° F. The operating temperature inside the combustion chamber 11 will be hot enough to cause the inorganic ash in the waste material to melt into a fluid state. The molten inorganic ash is drained through the bottom of the combustion chamber 11 by a line 12, where the slag is quenched. The spent combustion exhaust gas exits the combustion chamber through a line 13 at a temperature of 2,500° F. to 3,500° F. and enters a mixing chamber 14. The hot exhaust gases mix with cool recycled gases that enter from a line 33. The flow of cool recycled gas is moderated to control the gas temperature exiting the mixer 14 through a line 15 to a temperature of 750° F. to 1,400° F. In an alternate arrangement, the mixing chamber 14 would be replaced with a steam boiler.

The exhaust gas from line 15 enters a gas-to-gas heat exchanger 16 where heat is transferred from the exhaust gas to regenerated and recycled combustion gas. The heat exchanger 16 is desirable but optional depending on the operating parameters of the system. The exhaust gas then proceeds through a line 17 to a steam boiler or water heater 18 in which additional cooling of the exhaust gas will occur. Feedwater enters the boiler 18 through a line 19 and steam exits through a line 20. The cool combustion gas leaves the steam boiler 18 through a line 21 and enters a particulate filter 22 where fine particulate matter is captured and removed from the system through a line 23. The particulate free exhaust gases exit the filter through a line 24 and enter a water vapor condenser 25. Cool circulating water enters via a line 26 and exits via a line 27. A major portion of the water vapor condenses out of the exhaust gas steam and is drained through a line 28. The vapor condenser 25 is preferably constructed from corrosion resistant materials. The vapor condenser will also further remove particulate matter not captured in the particulate filter 22.

After most of the water vapor has been removed, the exhaust gas exits through a line 29. At this point in the process most (75% to 95% by volume) of the process gas stream is carbon dioxide ($CO_2$) along with small amounts of nitrogen ($N_2$), oxygen ($O_2$), and water vapor ($H_2O$). The process gas stream will also contain trace amounts of nitrogen dioxide ($NO_2$), sulfur dioxide ($SO_2$), volatile organic compounds ($H_xC_y$), hydrogen chloride (HCl), carbon monoxide (CO) and particulate matter.

A first portion of the gas stream is recirculated back into the combustion loop through a line 31, with the remainder of the gas stream proceeding through a line 30 for further processing. The mass flow rate of carbon dioxide through line 30 is equal to the amount of carbon dioxide formed during the combustion phase of the process under steady state conditions. The first portion of the gas flow that is to be recirculated enters a fan 32 which provides the necessary head to overcome pressure losses as the gas flows through the closed loop. The gas flow exits fan 32 and splits into lines 33 and lines 34. The gas flow in line 34 mixes with concentrated oxygen in a line 40 leading from a source 38. The concentration of oxygen in the line 40 will normally range from 90% to 95% oxygen by volume. Line 35 receives the mixed gas stream from lines 34 and 40. The mixed gas has now been regenerated and contains sufficient oxygen concentration for combustion. Typical oxygen concentrations in the regenerated gas stream can range from 30% to 80% oxygen by volume, with optimum concentrations of 40% to 55%. The desired oxygen concentration in the regenerated gas stream is selected based on maintaining optimum combustion temperatures and combustion efficiency in the combustion chamber 11. The desired oxygen concentration may vary with waste fuel, combustion technology, and other operating factors. The amount of oxygen in the mixed gas stream is sensed by an oxygen sensor 57 and is controlled by a valve 58 in line 40.

The regenerated gas in line 35 enters the gas-to-gas heat exchanger 16 where it receives heat from the exhaust gas. A higher temperature in the regenerated gas will enhance combustion performance. The temperature of the regenerated gas will normally range from 400° F. to 1200° F. The heated regenerated gas enters a line 36 where it proceeds to the combustion chamber 11.

The concentrated oxygen is generated in an air separation unit 38, which accepts air through line 37 and separates oxygen ($O_2$) from nitrogen ($N_2$). The oxygen exits through line 40 while the nitrogen is vented back to the atmosphere through a line 39. The art of air separation is well established. Air separation can be performed by any number of methods, such as vacuum pressure swing absorption, or cryogenic air separation. Either method can provide a suitable supply on concentrated oxygen.

In special circumstances where the recovery of carbon dioxide is not desired, a second portion of the exhaust gas from line 30 may be vented directly to the atmosphere or through a final filter (not shown) and then to the atmosphere.

If carbon dioxide is to be recovered, the excess gas in line 30 proceeds to a gas clean up system 41. The presence of a number of trace gases may impact the product quality and marketability. The trace gases would include nitrogen dioxide ($NO_2$), sulfur dioxide ($SO_2$), hydrogen chloride (HCl), hydro carbon based gases ($H_xC_y$), and carbon monoxide (CO). The presence and concentration of the various compounds will be a function of the waste fuels consumed and the operating parameters of the combustion system. In practice, system 41 would consist of several steps, and would likely include, but is not necessarily limited to: heat exchangers for modifying the gas temperature, gas heaters, catalyst beds (for reducing trace gases such as $NO_2$, CO, $H_xC_y$, into $N_2$, $H_2O$ and $CO_2$), scrubbers (for direct removal of HCl and $SO_2$ with the use of reagents), dehumidifiers or desiccant dryers (for removal of water vapor), and final filters (for removal of any fine particulate matter). The sequence and selection of the various removal equipment is known in the art and will vary with the initial concentrations of the trace gases and what end product specifications are desired.

The cleaned gases exit system 41 into a line 42 and proceed to a compressor 43. The gas pressure at the inlet to the compressor is at or below 1.0 atmospheres (14.7 psia). To provide for proper conditions to allow the carbon dioxide to liquefy, the compressor 43 compresses the gas to pressures of 20 to 65 atmospheres. The compressed gas exits through a line 46. The compressor is cooled with water from a line 44, and the heated water line leaves via a line 45.

The compressed gas enters a heat exchanger 48, where the gas is cooled indirectly with refrigerant furnished through a line 47. The refrigerant temperature will typically range from 30° F. to minus 30° F. depending on initial gas compressor operating pressure and the desired carbon dioxide removal efficiency. A portion of the carbon dioxide is transformed from a gas to a liquid and drained out through a line 49. Nitrogen and oxygen, along with some carbon dioxide that was not liquefied in the first stage, exhaust through a line 50 and enter a heat exchanger 52. Refrigerant from a line 51, which would typically range from 0° F. to minus 55° F., will further cool the exhaust gases and liquefy additional carbon dioxide. The additional carbon dioxide exits through a line 53 and is combined with that in line 49 to a line 55. The carbon dioxide in line 55 would be handled as a conventional liquid carbon dioxide product. Gas exiting via a line 54 is vented and will consist primarily of nitrogen and oxygen along with a small percentage of carbon dioxide that was not liquefied.

The second stage of separation (heat exchanger 52) is optional and its need is based on the desired $CO_2$ collection efficiency. If the second stage of separation is not utilized, line 50 would vent to the atmosphere.

Rather than mix the concentrated oxygen from the source 38 with the recirculated gas in line 34, the oxygen can be introduced directly into the combustion chamber 11 through a line 59. The oxygen concentration of the gases entering the chamber 11 would be maintained at the same levels discussed above with respect to the regenerated gas stream.

Supplemental fuels such as natural gas, propane, petroleum oil, wood, and coal may be added to the combustion chamber 11 through a line 60 to maintain the temperature necessary to melt the inorganic material.

I claim:

1. A method of treating organic waste material characterized by high ash content and a heat value of about 500 to about 9,000 Btus per pound, comprising:

introducing the waste material into a slagging combustor;

burning the waste material in the combustor to produce a slag of molten inorganic ash and exhaust gases;

removing the slag from the combustor;

removing the exhaust gases from the combustor;

thereafter treating the exhaust gases to remove a substantial portion of particulate matter from the exhaust gases and to dry the exhaust gases;

dividing the treated exhaust gases into more than one portion; and introducing a first portion of the treated exhaust gases and concentrated oxygen gas into the combustor in a proportion that results in the introduced gases having a combined oxygen concentration of at least 30% by volume.

2. A method according to claim 1 wherein the first portion of the treated exhaust gases and the concentrated oxygen gas are mixed together to form mixed gases before being introduced in the combustor.

3. A method according to claim 2 wherein the proportion of oxygen in the mixed gases is from about 40% to about 55% by volume.

4. A method according to claim 1 together with the step of treating a second portion of the treated exhaust gases to recover the carbon dioxide from the second portion of the treated exhaust gases.

5. A method according to claim 2 wherein the step of treating the exhaust gases includes cooling the exhaust gases.

6. A method according to claim 5 together with a step of transferring a portion of the heat from the exhaust gases removed from the combustor to the mixed gases before the mixed gases are introduced into the combustor.

7. The method according to claim 6 together with a step of mixing a third portion of the treated exhaust gases with the exhaust gases removed from the combustor.

8. A method according to claim 7 wherein the third portion of the treated exhaust gases is mixed with the exhaust gases removed from the combustor before transferring the heat of the exhaust gases to the mixed gases.

9. A method according to claim 5 wherein the exhaust gases are cooled by mixing a third portion of the treated exhaust gases with the exhaust gases removed from the combustor.

10. A method according to claim 1 wherein the waste material is selected from the group consisting of municipal solid waste, paper mill sludge, and waste water treatment sludge.

11. A method according to claim 1 wherein a fluxing agent is mixed with the waste material before introduction into the combustor.

12. A method according to claim 1 wherein a glass forming mineral is mixed with the waste materials before introduction into the combustor.

13. A method according to claim 1 wherein a supplemental fuel is introduced into the combustor in addition to the waste material.

14. A method of treating organic waste material characterized by high ash content and a heat value of about 500 to about 9,000 Btus per pound, comprising:

introducing the waste material into a slagging combustor;

burning the waste material in the combustor to produce a slag of molten inorganic ash and exhaust gases;

removing the slag from the combustor;

removing the exhaust gases from the combustor;

cooling and drying the exhaust gases;

dividing the cooled and dried exhaust gases into more than one portion;

introducing a first portion of the cooled and dried exhaust gases and concentrated oxygen gas into the combustor in a proportion that results in the introduced gases having a combined oxygen concentration of at least 30% by volume; and treating a second portion of the cooled exhaust gases to recover the carbon dioxide from such second portion.

15. A method according to claim 14 wherein the first portion of the cooled and dried exhaust gases and the concentrated oxygen gas are mixed together to form mixed gases before being introduced into the combustor.

16. A method according to claim 15 wherein the proportion of oxygen in the mixed gases is from about 40% to about 55% by volume.

17. A method according to claim 15 together with the step of transferring a portion of the heat from the exhaust gases removed from the combustor to the mixed gases before the mixed gases are introduced into the combustor.

18. A method according to claim 17 together with a step of mixing a third portion of the cooled and dried exhaust gases with the exhaust gases removed from the combustor.

19. A method according to claim 18 wherein the third portion of the cooled and dried exhaust gases is mixed with the exhaust gases removed from the combustor before transferring the heat of the exhaust gases to the mixed gases.

20. A method according to claim 14 wherein the exhaust gases are cooled by mixing a third portion of the cooled and dried exhaust gases with the exhaust gases removed from the combustor.

21. A method according to claim 14 together with a step of treating the exhaust gases to remove a major portion of the particulate matter from the exhaust gases before mixing with a source of oxygen.

22. A method according to claim 14 wherein a fluxing agent is mixed with the waste material before introduction into the combustor.

23. A method according to claim 14 wherein a glass forming mineral is mixed with the waste materials before introduction into the combustor.

24. A method according to claim 14 wherein a supplemental fuel is introduced into the combustor in addition to the waste material.

* * * * *